United States Patent [19]

Mattson

[11] Patent Number: 5,523,264
[45] Date of Patent: Jun. 4, 1996

[54] GLASS COMPOSITIONS AND FIBERS THEREFROM

[75] Inventor: Stephanie M. Mattson, Newark, Ohio

[73] Assignee: Owens-Corning Fiberglas Technology, Inc., Summit, Ill.

[21] Appl. No.: 414,689

[22] Filed: Mar. 31, 1995

[51] Int. Cl.$^6$ .................. C03C 13/00; C03C 3/089; C03C 3/091
[52] U.S. Cl. .................. 501/35; 501/65; 501/66
[58] Field of Search .................. 501/35, 65, 66

[56] References Cited

U.S. PATENT DOCUMENTS

| | | | |
|---|---|---|---|
| 3,853,569 | 12/1974 | Laurent et al. | 501/35 |
| 4,177,077 | 12/1979 | Gagin | 106/50 |
| 4,562,161 | 12/1985 | Mennemann et al. | 501/59 |
| 5,055,428 | 10/1991 | Potter | 501/35 |
| 5,108,957 | 4/1992 | Cohen et al. | 501/35 |
| 5,401,693 | 3/1995 | Bauer et al. | 501/35 |

FOREIGN PATENT DOCUMENTS

| | | | |
|---|---|---|---|
| 0399320 | 5/1990 | European Pat. Off. | |
| 0412878 | 8/1990 | European Pat. Off. | |
| 0588251 | 9/1993 | European Pat. Off. | |
| 811243 | 4/1959 | United Kingdom | 501/35 |
| 2025928 | 1/1980 | United Kingdom | 501/35 |
| 8912032 | 12/1989 | WIPO | |

Primary Examiner—Mark L. Bell
Assistant Examiner—Louis M. Troilo
Attorney, Agent, or Firm—C. M. Gegenheimer; Patrick P. Pacella

[57] ABSTRACT

Fiberizable glass composition with increased levels of $B_2O_3$ and $Na_2O$ are suitable for insulation. Coupled with alumina levels as high as possible, these glasses have improved durability. Moreover, these glasses have physical properties which allow current processes to fabricate them into insulation. The glasses also meet proposed German regulations regarding $Kl \geq 40$.

14 Claims, No Drawings

GLASS COMPOSITIONS AND FIBERS THEREFROM

TECHNICAL FIELD

This invention relates to soda, lime borosilicate glass compositions. Fibers from these compositions make glass fiber insulation.

BACKGROUND OF THE INVENTION

Glass fiber insulation is well known and has been a commercial product for a long period of time. The insulation is made from intertwined soda lime alumino borosilicate glass fiber which a binder holds together. The binder may be any suitable material but quite commonly is a phenol-formaldehyde resin or a ureaformaldehyde resin. These binders are well known and a spray nozzle generally applies them to the glass fibers as hot gases attenuate the fibers from a rotating device, commonly called a spinner. A conveyer collects the binder-coated fibers in the form of a blanket, and heat cures the blanket to produce the final insulation. The process produces various densities by varying the conveyor speed and the thickness of the cured insulation.

It is well established that asbestos fibers when inhaled can cause significant disease in man. Though the exact mechanisms responsible for the biological activity of inhaled asbestos fibers is unknown, it is widely believed that their ability to remain in the lung for extended periods of time is an important factor. Glass fibers have not been linked to disease in man. Additionally, their durability or residence time in the lung appears much less than asbestos fibers.

Despite this, the German government have proposed regulations for glass fibers. Glass fiber compositions meeting the regulations are considered to be free of suspicion. The problem, however, for the manufacturer is to produce glass fibers which meet the regulations and standard criteria. These glasses must meet the proposed regulations, be fiberizable in standard wool processes, have sufficient durability and have acceptable insulating properties.

DISCLOSURE OF THE INVENTION

I have developed glass compositions which meet all the criteria. My glasses have a high boron content, a high soda content and contain small amounts of alumina. My glass compositions meet the proposed German regulations. They have a numerical index (KI) greater than or equal to 40. Standard wool processes easily produce fibers from these compositions. The difference (delta T) between the log 3 temperature and the liquidus temperature generally is 200° F. or higher. Durability as shown by fiber weight loss is less than 5% fiber weight loss after 24 hours.

I also found these glasses to have acceptable insulating properties. The glass fibers were collected and formed into standard insulation products in the shape of wool batts. The wool was found to have acceptable insulative values and compression (recovery) properties.

BEST MODE OF CARRYING OUT INVENTION

I made measurements of viscosity, liquidus and durability for a number of glasses with KI≧40. My measurements indicated a compositional region of glasses which are useful for production of glass fiber insulation. This range is as follows for the major components:

| Ingredient | Weight Percent |
| --- | --- |
| $SiO_2$ | 45.0 to 60.0 |
| $Al_2O_3$ | 0.0 to 3.0 |
| CaO + MgO | 7.0 to 14.0 |
| $Na_2O + K_2O$ | 14.0 to 22.0 |
| $B_2O_3$ | 8.0 to 20.0 |

The glasses may contain up to 3% BaO and less than 1% of any or all of $Fe_2O_3$, $TiO_2$, SrO or $SO_3$ with the proviso that the sum of all components not included in the index, such as $SiO_2$ or $SO_3$, do not exceed 60-3 $Al_2O_3$, the total being 100% by weight.

A preferred range for the major compounds is as follows:

| Ingredient | Weight Percent |
| --- | --- |
| $SiO_2$ | 51.0 to 58.0 |
| $Al_2O_3$ | 0.8 to 2.5 |
| CaO + MgO | 8.0 to 13.0 |
| $Na_2O + K_2O$ | 14.0 to 22.0 |
| $B_2O_3$ | 10.0 to 18.0 |

These glasses may contain up to 3% BaO and less than 1% of any or all of $Fe_2O_3$, $TiO_2$, SrO or $SO_3$ with the proviso that the sum of all components not include in the index, such as $SiO_2$ or $SO_3$, do not exceed 60-3 $Al_2O_3$, the total being 100% by weight.

A more preferred range is as follows:

| Ingredient | Weight Percent |
| --- | --- |
| $SiO_2$ | 53.0 to 57.0 |
| $Al_2O_3$ | 1.0 to 2.0 |
| CaO + MgO | 10.0 to 13.0 |
| $Na_2O + K_2O$ | 15.0 to 20.0 |
| $B_2O_3$ | 12.0 to 18.0 | the remainder being up to 3% BaO, and less than 1% of any or all of $Fe_2O_3$ $TiO_2$, SrO or $SO_3$, with the proviso that the sum of all components not include in the index, such as $SiO_2$ or $SO_3$, do not exceed 60-3 $Al_2O_3$ the total being 100% by weight.

The German regulation requires a numerical index (KI) greater than or equal to 40 to be considered free of suspicion. The index is calculated by KI=Σ($Na_2O$, $K_2O$, CaO, MgO, BaO, $B_2O_3$)—2$Al_2O_3$. This places severe restrictions on alumina levels and anything not included in the index, such as silica. The obvious choice is to lower alumina to very low levels. These glasses, however, have poor durabilities and most could not be fiberized by a standard wool process. I discovered that pushing alumina levels as high as possible and raising $B_2O_3$ level yielded glasses with significantly improved durability and fiberizability by standard processes.

I designed an array of glasses to show the effect of glass composition in this narrow field on select properties. All glasses are shown together with measured properties in the following table. This data shows the best glasses, in terms of durability, with alumina levels between 1.5 and 2 weight percent and $B_2O_3$ between 14 and 16%. Soda, normally considered bad for durability, is better at levels exceeding $B_2O_3$. Durabilities are shown in terms of percent fiber weight loss (% fwl) after one day (1 D) exposure to water at 205° F. Our current conventional glasses lose up to 3.9% in 24 hours. Four of these glasses are within the range of normal glasses. Another important property is shown as delta T, the key difference between the log 3 temperature and the liquidus temperature. A normal constraint is a delta T of 200 deg F. In some cases, this possibly may be lowered to 150° F. or 175° F. Further lowering of delta T would require spinner modification. Five glasses meet the 200 deg constraint. One glass met both durability and forming constraints and thus could be fiberized in standard processes. Glasses with alternative compositions are suggested by the data which generally meet the criteria. All the glasses had an index of 40 or higher.

TABLE

| Ingredients | No. 1 | No. 2 | No. 3 |
|---|---|---|---|
| $SiO_2$ | 56.6 | 55.3 | 58.7 |
| $Al_2O_3$ | 0.41 | 1.38 | 0.3 |
| CaO | 6.43 | 8.64 | 9.3 |
| MgO | 3.86 | 2.28 | 0.01 |
| $Na_2O$ | 18.8 | 15.7 | 16.2 |
| $K_2O$ | 0.15 | 0.72 | 0.1 |
| $B_2O_3$ | 12.2 | 15.7 | 15 |
| $Fe_2O_3$ | 0.31 | 0.15 | 0.04 |
| MnO | 0.38 | | |
| $TiO_2$ | | | |
| $ZrO_2$ | | | |
| $SO_3$ | 0.6 | 0.2 | 0.25 |
| $P_2O_5$ | 0.17 | | |
| Log 3 viscosity temperature (F.°) | 1695 | 1706 | 1730 |
| Liquidus temperature (F.°) | 1541 | 1581 | 1521 |
| KI | 40.9 | 40.2 | 40.1 |
| delta T | 154 | 125 | 209 |
| durability (%) fwl after one day* | 11.5 | 4.27 | 4.53 |

| Ingredients | No. 4 | No. 5 | No. 6 | No. 7 | No. 8 |
|---|---|---|---|---|---|
| $SiO_2$ | 55.64 | 55.95 | 53.68 | 57.65 | 55.18 |
| $Al_2O_3$ | 1 | 0.83 | 2 | 0.6 | 1.5 |
| CaO | 8.51 | 8.47 | 8.16 | 8.32 | 8.48 |
| MgO | 3.01 | 4.09 | 1.89 | 2.06 | 2.77 |
| $Na_2O$ | 17.35 | 17.69 | 16.49 | 15.07 | 17.46 |
| $K_2O$ | 0.19 | 0.23 | 0.7 | 0.18 | 0.53 |
| $B_2O_3$ | 13.64 | 11.35 | 17 | 15.74 | 14 |
| $Fe_2O_3$ | 0.33 | 0.29 | 0.08 | 0.38 | 0.08 |
| MnO | | 0.62 | | | |
| $TiO_2$ | 0.07 | 0.05 | | | |
| $ZrO_2$ | | | | | |
| $SO_3$ | 0.16 | 0.38 | | | |
| $P_2O_5$ | | | | | |
| Log 3 viscosity temperature (F.°) | 1693 | 1698 | 1687 | 1746 | 1689 |
| Liquidus temperature (F.°) | 1521 | 1637 | 1586 | 1541 | 1544 |
| KI | 40.7 | 40.2 | 40.24 | 40.17 | 40.24 |
| delta T | 172 | 61 | 101 | 205 | 145 |
| durability (%) fwl after one day* | 5.1 | 6.16 | 4.16 | 5.3 | 3.90 |

| Ingredients | No. 9 | No. 10 | No. 11 | No. 12 | No. 13 |
|---|---|---|---|---|---|
| $SiO_2$ | 53.67 | 56.65 | 53.68 | 53.69 | 53.69 |
| $Al_2O_3$ | 2 | 1 | 2 | 2 | 2 |
| CaO | 8.64 | 9.33 | 8.24 | 8.8 | 8.07 |
| MgO | 2.88 | 0.29 | 1.61 | 2.32 | 2.16 |
| $Na_2O$ | 18.02 | 14.29 | 15.69 | 16.41 | 17.3 |
| $K_2O$ | 0.7 | 0.34 | 0.7 | 0.7 | 0.7 |
| $B_2O_3$ | 14 | 18 | 18 | 16 | 16 |
| $Fe_2O_3$ | 0.09 | 0.1 | 0.08 | 0.08 | 0.08 |
| MnO | | | | | |
| $TiO_2$ | | | | | |
| $ZrO_2$ | | | | | |
| $SO_3$ | | | | | |
| $P_2O_5$ | | | | | |
| Log 3 viscosity temperature (F.°) | 1669 | 1739 | 1691 | 1681 | 1677 |
| Liquidus temperature (F.°) | 1536 | 1550 | 1491 | 1521 | 1446 |
| KI | 40.24 | 40.25 | 40.24 | 40.23 | 40.23 |
| delta T | 133 | 189 | 200 | 160 | 231 |
| durability (%) fwl after one day* | 3.5 | 4.39 | 4.44 | 3.57 | 3.86 |

| Ingredients | No. 14 | No. 15 | No. 16 | No. 17 |
|---|---|---|---|---|
| $SiO_2$ | 56.68 | 56.68 | 56.67 | 56.12 |
| $Al_2O_3$ | 1 | 1 | 1 | 1.12 |
| CaO | 8.5 | 8.33 | 8.17 | 8.26 |
| MgO | 2.1 | 2.66 | 3.21 | 1.53 |
| $Na_2O$ | 15.3 | 16.91 | 18.52 | 14.5 |
| $K_2O$ | 0.35 | 0.35 | 0.35 | 0.37 |
| $B_2O_3$ | 16 | 14 | 12 | 17.8 |
| $Fe_2O_3$ | 0.07 | 0.07 | 0.08 | 0.3 |
| MnO | | | | |
| $TiO_2$ | | | | |
| $ZrO_2$ | | | | |
| $SO_3$ | | | | |
| $P_2O_5$ | | | | |
| Log 3 Viscosity temperature (F.°) | 1728 | 1711 | 1698 | 1736 |
| Liquidus temperature (F.°) | 1506 | 1554 | 1531 | 1519 |
| KI | 40.25 | 40.25 | 40.25 | 40.22 |
| delta T | 222 | 157 | 167 | 217 |
| durability (%) fwl after one day* | 4.25 | 4.43 | 4.95 | 4.76 |

*Exposure to water at 205° F.

What is claimed is:

1. Fiberizable glass compositions suitable for insulation consisting essentially of:

| Ingredient | Weight Percent |
|---|---|
| $SiO_2$ | 45.0 to 60.0 |
| $Al_2O_3$ | 0.0 to 3.0 |
| CaO + MgO | 7.0 to 14.0 |
| $Na_2O + K_2O$ | 14.0 to 22.0 |
| $B_2O_3$ | 8.0 to 20.0 | the remainder being up to 3% BaO, and less than 1% of any or all of $Fe_2O_3$ $TiO_2$, SrO or $SO_2$, the total being 100% by weight, wherein the glass compositions have a Kl value equal to or greater than 40.

2. Fiberizable glass compositions suitable for insulation consisting essentially of:

| Ingredient | Weight Percent |
|---|---|
| $SiO_2$ | 51.0 to 58.0 |
| $Al_2O_3$ | 0.8 to 2.5 |
| CaO + MgO | 8.0 to 13.0 |
| $Na_2O + K_2O$ | 14.0 to 22.0 |
| $B_2O_3$ | 10.0 to 18.0 | the remainder being up to 3% BaO, and less than 1% of any or all of $Fe_2O_3$ $TiO_2$, SrO or $SO_2$, the total being 100% by weight, wherein the glass compositions have a Kl value equal to or greater than 40.

3. Fiberizable glass compositions suitable for insulation consisting essentially of:

| Ingredient | Weight Percent |
|---|---|
| $SiO_2$ | 53.0 to 57.0 |
| $Al_2O_3$ | 1.0 to 2.0 |
| CaO + MgO | 10.0 to 13.0 |

| Ingredient | Weight Percent |
| --- | --- |
| $Na_2O + K_2O$ | 15.0 to 20.0 |
| $B_2O_3$ | 12.0 to 18.0 | the remainder being up to 3% BaO, and less than 1% of any or all of $Fe_2O_3$, $TiO_2$, SrO or $SO_2$, the total being 100% by weight, wherein the glass compositions have a Kl value equal to or greater than 40.

4. A glass composition according to claim 1 having compositions of:

| Ingredients | Weight Percent |
| --- | --- |
| $SiO_2$ | 53.69 |
| $Al_2O_3$ | 2.0 |
| CaO | 8.07 |
| MgO | 2.16 |
| $Na_2O$ | 17.3 |
| $K_2O$ | 0.7 |
| $B_2O_3$ | 16.0 |
| $Fe_2O_3$ | 0.08. |

5. A glass composition according to claim 1, wherein the weight percent of CaO ranges from 7.0 to 12.0 and the weight percent of MgO ranges from 0.0 to 4.0.

6. A glass composition according to claim 1, wherein the weight percent of $K_2O$ ranges from 0.1 to 3.0.

7. A glass composition according to claim 1, wherein the weight percent of $K_2O$ ranges from 0.1 to 1.0.

8. Glass fiber insulation comprising soda lime borosilicate glass fibers having a glass composition consisting essentially of:

| Ingredient | Weight Percent |
| --- | --- |
| $SiO_2$ | 45.0 to 60.0 |
| $Al_2O_3$ | 0.0 to 3.0 |
| CaO + MgO | 7.0 to 14.0 |
| $Na_2O + K_2O$ | 14.0 to 22.0 |
| $B_2O_3$ | 8.0 to 20.0 | the remainder being up to 3% BaO, and less than 1% of any or all of $Fe_2O_3$, $TiO_2$, SrO or $SO_2$, the total being 100% by weight, wherein the glass compositions have a Kl value equal to or greater than 40.

9. Glass fiber insulation comprising soda lime borosilicate glass fibers having a glass composition consisting essentially of:

| Ingredient | Weight Percent |
| --- | --- |
| $SiO_2$ | 51.0 to 58.0 |
| $Al_2O_3$ | 0.8 to 2.5 |
| CaO + MgO | 8.0 to 13.0 |
| $Na_2O + K_2O$ | 14.0 to 22.0 |
| $B_2O_3$ | 10.0 to 18.0 | the remainder being up to 3% BaO, and less than 1% of any or all of $Fe_2O_3$, $TiO_2$, SrO or $SO_2$, the total being 100% by weight, wherein the glass compositions have a Kl value equal to or greater than 40.

10. Glass fiber insulation comprising soda lime borosilicate glass fibers having a glass composition consisting essentially of:

| Ingredient | Weight Percent |
| --- | --- |
| $SiO_2$ | 53.0 to 57.0 |
| $Al_2O_3$ | 1.0 to 2.0 |
| CaO + MgO | 10.0 to 13.0 |
| $Na_2O + K_2O$ | 15.0 to 20.0 |
| $B_2O_3$ | 12.0 to 18.0 | the remainder being up to 3% BaO, and less than 1% of any or all of $Fe_2O_3$, $TiO_2$, SrO or $SO_2$, the total being 100% by weight, wherein the glass compositions have a Kl value equal to or greater than 40.

11. Glass fiber insulation according to claim 8 having a glass composition of:

| Ingredients | Weight Percent |
| --- | --- |
| $SiO_2$ | 53.69 |
| $Al_2O_3$ | 2.0 |
| CaO | 8.07 |
| MgO | 2.16 |
| $Na_2O$ | 17.3 |
| $K_2O$ | 0.7 |
| $B_2O_3$ | 16.0 |
| $Fe_2O_3$ | 0.08. |

12. Glass fiber insulation according to claim 8, wherein the weight percent of CaO ranges from 7.0 to 12.0 and the weight percent of MgO ranges from 0.0 to 4.0.

13. Glass fiber insulation according to claim 8, wherein the weight percent of $K_2O$ ranges from 0.1 to 3.0.

14. Glass fiber insulation according to claim 8, wherein the weight percent of $K_2O$ ranges from 0.1 to 1.0.

* * * * *